United States Patent Office 3,746,529
Patented July 17, 1973

3,746,529
HERBICIDAL COMPOSITIONS OF NEW UREA AND THIOUREA DERIVATIVES
Daniel Bertin, Montrouge, and Jacques Perronnet and André Teche, Paris, France, assignors to Roussel-UCLAF, Paris, France
No Drawing. Original application Jan. 14, 1970, Ser. No. 2,975. Divided and this application June 16, 1971, Ser. No. 153,815
Claims priority, application France, Jan. 20, 1969, 6900886
Int. Cl. A01n 9/20
U.S. Cl. 71—88                                21 Claims

ABSTRACT OF THE DISCLOSURE

Urea and thiourea derivatives of Formula I:

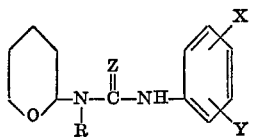

wherein R represents a lower alkyl radical, X and Y, identical or different, are selected from the group consisting of a hydrogen atom, a chlorine atom, a bromine atom, a nitro radical, a trifluoromethyl radical, a lower alkyloxy radical, a lower alkyl radical, a lower alkenyloxy radical, a halogen-substituted lower alkenyloxy radical, a lower alkyloxycarbonyl radical, a lower alkylthio radical, a lower alkylsulfinyl radical and a lower alkylsulfonyl radical, and Z is selected from the group consisting of an oxygen atom and a sulfur atom, process for their preparation, compositions containing them, and pesticidal method. The derivatives of Formula I possess pesticidal, particularly herbicidal properties.

PRIOR APPLICATION

This application is a divisional of copending U.S. application Ser. No. 2,975 filed Jan. 14, 1970, now U.S. Pat. No. 3,631,180.

THE PRIOR ART

U.S. Pat. No. 3,311,641 discloses N-(2-tetrahydropyrannyl)-amides which are useful as fungicidal agents.

U.S. Pat. No. 3,168,545 discloses the preparation of N-(2-tetrahydropyrannyl)-N'-phenylurea in order to characterize 2-tetrahydropyrannyl isocyanate.

OBJECTS OF THE INVENTION

It is an object of the invention to provide the novel urea and thiourea derivatives of Formula I.

It is another object of the invention to provide a process for the preparation of the derivatives of Formula I.

It is a further object of the invention to provide novel herbicidal compositions.

It is an additional object of the invention to provide a novel method of controlling weeds.

These and other objects and advantages of the invention will become obvious from the following detailed description.

THE INVENTION

The invention relates to new substituted ureas and thioureas of the general Formula I:

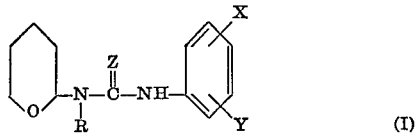

wherein R is a lower alkyl radical, X and Y, identical or different, are selected from the group consisting of a hydrogen atom, a chlorine atom, a bromine atom, a nitro radical, or trifluoromethyl radical, a lower alkyloxy radical, a lower alkyl radical, a lower alkenyloxy radical, a halogen-substituted lower alkenyloxy radical, a lower alkyloxycarbonyl radical, a lower alkylthio radical, a lower alkylsulfinyl radical and a lower alkylsulfonyl radical, Z is selected from the group consisting of an oxygen atom and a sulfur atom.

The substituent R is preferably an alkyl radical containing from 1 to 7 carbon atoms, such as methyl, ethyl, n-propyl, isopropyl, n-butyl t-butyl, pentyl, hexyl or heptyl.

In the definition of the substituents X and Y:

The lower alkyl radical, as well as the alkyl residues of the lower alkoxy, alkylthio and akyloxycarbonyl radicals contain preferably from 1 to 4 carbon atoms and may be for example methyl, ethyl, n-propyl or n-butyl;

The alkyl residues of the lower alkylsulfinyl and alkylsulfonyl radicals contain preferably from 1 to 3 carbon atoms and may be for example, ethyl or n-propyl;

The alkenyl group of the lower alkenyloxy radical contains preferably from 2 to 4 carbon atoms and may be, for example, an allyl, a 2-butenyl or a methylallyl group. Said alkenyl group may be substituted by a halogen atom, preferably selected from the group consisting of a chlorine atom and a bromine atom, e.g., the chloroallyl group.

It is to be understood that in Formula I, substituent X may be either in the para- or in the meta- position, while substituent Y may be either in the ortho- or in the meta-position.

The Compounds I are endowed with remarkable pesticidal, specifically herbicidal properties which make them suitable for being used in agriculture, in the control of harmful organisms and specifically in the control of weeds.

Among the preferred compounds are the compounds of the formula:

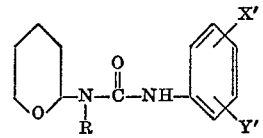

wherein R is a lower alkyl radical, X' is selected from the group consisting of a hydrogen atom, a chlorine atom and a bromine atom and Y' is selected from the group consisting of a hydrogen atom, a chlorine atom, a bromine atom, a nitro group and a trifluoromethyl group.

Among the Compounds I, one can mentioned more especially the following compounds:

N-methyl-N-(2-tetrahydropyrannyl)-N'-(3',4'-dichlorophenyl)-urea.
N-methyl-N-(2-tetrahydropyrannyl)-N'-(4'-bromophenyl)-urea.
N-methyl-N-(2-tetrahydropyrannyl)-N'-(4'-nitrophenyl)-urea.
N-methyl-N-(2-tetrahydropyrannyl)-N'-(2-nitrophenyl)-urea.
N-methyl-N-(2-tetrahydropyrannyl)-N'-phenylurea.
N-methyl-N-(2-tetrahydropyrannyl)-N'-(3'-trifluoromethylphenyl)-urea.
N-ethyl-N-(2-tetrahydropyrannyl)-N'-(3,4'-dichlorophenyl)-urea.
N-methyl-N-(2-tetrahydropyrannyl)-N'-(4'-methoxyphenyl)-urea.
N-methyl-N-(2-tetrahydropyrannyl)-N'-(3'-methoxyphenyl)-urea.
N-methyl-N-(2-tetrahydropyrannyl)-N'-[4'-(3''-chloroallyloxy)-phenyl]-urea.

N-methyl-N-(2-tetrahydropyrannyl)-N'-[3'-(3'''-chloro-
  allyloxy)-phenyl]-urea.
N-methyl-N-(2-tetrahydropyrannyl)-(2'-methoxycar-
  bonylphenyl)-urea.
N-methyl-N-(2-tetrahydropyrannyl)-N'-(3'-methylthio-
  phenyl)-urea.
N-methyl-N-(2-tetrahydropyrannyl)-N'-(3'-methylsul-
  finylphenyl)-urea.
N-methyl-N-(2-tetrahydropyannyl)-N'-(3'-methylsul-
  fonylphenyl)-urea.
N-methyl-N-(2-tetrahydropyrannyl)-N'-(3'-chloro-4'-
  methoxyphenyl)-urea.
N-methyl-N-(2-tetrahydropyrannyl)-N'-(3'-chloro-4'-
  methylphenyl)-urea.
N-methyl-N-(2-tetrahydropyrannyl)-N'-(3',4'-dichloro-
  phenyl)-thiourea.

The process for preparing the Compound I comprises reacting a 2-alkylamino-tetrahydropyran, of the Formula II:

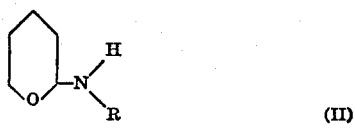

wherein R is as defined above, with a compound of the Formula III:

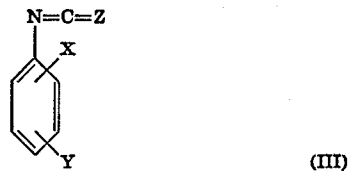

wherein X, Y and Z are as defined above and recovering the N-alkyl N-(2-tetrahydropyrannyl)-N'-(X,Y-phenyl)-urea or thiourea thus formed.

Preferably, the process of the invention is carried out in an organic solvent such as an ether like, for example, ethyl ether, isopropyl ether or tetrahydrofuran.

The preparation of the 2-alkylamino tetrahydropyrans, II, is described by C. Glacet and D. Véron [C. R. Acad. Sci., 248, 1347 (1959)].

The preparation of 2-methylamino tetrahydropyran is described, by way of exemplification, in the experimental part of the description.

The X,Y-substituted phenyl isocyanates or isothiocyanates, III, can be prepared by the action of phosgene or thiophosgene on an X,Y-substituted aniline. Examples of such preparations are given in the experimental part of the description.

The invention likewise concerns pesticidal, specifically herbicidal compositions containing as active ingredient at least one Compound I, possibly admixed with one or several other pesticidal agents or one or several products influencing plant growth. The said compositions generally contain from 5 to 80% by weight, preferably from 10 to 50% by weight, of active ingredient.

These compositions can be in the from of powders, granules, suspensions, emulsions, solutions containing together with the active principles, an adjuvant, such as cationic, anionic or non-ionic surface-active agents, such as aryl and alkylarylsulfonates, inert powders, such as talc, clays, silica, kaolin, silicates, kieselguhr, etc., and/or vehicle such as water, alcohols, aliphatic ketones, such as xylene or other organic solvents, mineral, animal or vegetable oils, etc.

The method of the invention is a method of pesticidal control, particularly a method of controlling the growth of weeds which comprises contacting the harmful organisms, and particularly the weeds, with a pesticidal amount, particularly a herbicidal amount of the above-defined compositions.

The compositions of the invention are applied at doses sufficient to exert their pesticidal, specifically herbicidal activities. The doses of active material to be applied may vary as a function of the weds, the nature of the ground and the weather conditions.

The invention also relates to the following intermediates:

p-(3'-chloroallyloxy)-phenyl-isocyanate.
1-(m-nitrophenoxy)-3-chloro-2-propene.
1-(m-aminophenoxy)-3-chloro-2-propene.
m-(3'-chlororallyloxy)-phenyl-isocyanate.
3-methylthiophenyl-isocyanate.
3-methylsulfinyl-phenyl-isocyanate.
3-methylsulfonyl-phenyl-isocyanate.
3-chloro-4-methylphenyl-isocyanate.
m-methoxy-phenyl-isocyanate.

The following examples illustrate the invention without however limiting it.

PREPARATIONS (I) p-(3'-chloroallyloxy)-phenyl-isocyanate

Stage A: 1-(p-nitrophenoxy)-3-chloro-2-propene.—Into 890 cc. of dimethylformamide, one introduces 426 g. of sodium n-nitrophenate, then 308 g. of 1,3-dichloro-propene, agitates for twenty hours at 100° C., cools, pours the reaction mixture into water, extracts the aqueous phase with chloroform, combines the chloroform extracts, washes them successively with water, with a normal aqueous soltuion of caustic soda, then with water, dries them, concentrates them of dryness by distillation under reduced pressure and obtains 490 g. of crude 1-(p-nitrophenoxy)-3-chloro-2-propene used as it is for the following stage.

This crude product contains a mixture of oil and crystals. One separates the crystals by suction-filtering, washes them with petroleum ether and obtains 1-(p-nitrophenoxy)-3-chloro-2-propene, M.P.=88° C.

Analysis.—$C_9H_8ClNO_3$; molecular weight=213.62. Calculated (percent): C, 50.60; H, 3.78; Cl, 16.6; N, 6.55. Found (percent): C, 50.9; H, 3.9; Cl, 16.8; N, 6.8.

Stage B: 1-(p-aminophenoxy)-3-chloro-2-propene.—Into 214 g. of granulated cast iron and 300 cc. of water one introduces slowly 30 cc. of 22° Bé. aqueous solution of hydrochloric acid, takes to reflux and introduces, in about one hour, 214 g. of 1-(p-nitrophenoxy)-3-chloro-2-propene, agitates for two hours at reflux, cools, brings to pH=10 with sodium carbonate, eliminates the insoluble matter by filtering, extracts the aqueous phase with methylene chloride, washes the combined methylene chloride phases with water, dries them, concentrates them to dryness by distilling under reduced pressure and obtains 177 g. of 1-p-aminopenoxy)-3-chloro-2-propene which one uses as it is for the following stage.

Stage C: p-(3'-chloroallyloxy)-phenyl-isocyanate.—Into 150 cc. of a 20% phosgene solution in toluene one introduces a solution of 34 g. of 1-(p-aminophenoxy)-3-chloro-2-propene in 240 cc. of toluene, one takes the suspension thus obtained to reflux, keeps reflux for three hours while bubbling in phosgene, concentrates to dryness by distilling under reduced pressure, distills the residue and obtains 23.5 g. of p-(3'-chloroallyloxy)-phenyl-isocyanate. B.P.=104° C. (0.3 mm. Hg).

As far as is known, this compound is not described in the literature.

(II) m-(3'-chloroallyloxy)-phenyl-isocyanate

Stage A: 1-(m-nitrophenoxy)-3-chloro-2-propene.—Into 210 cc. of dimethylformamide one introduces 155 g. of sodium m-nitrophenate, then 108 g. of 1,3-dichloro-propene, agitates for twenty hours at 100° C., cools, pours the reaction mixture into a mixture of water and ice, isolates the precipitate thus formed by suction-filtering, washes it with water, with an N sodium hydroxide solution, then with water, dried it and obtains 78 g. of 1-(m-nitrophenoxy)-3-chloro-2-propene.

As far as is known, this compound is not described in the literature.

Stage B: 1-(m-aminophenoxy)-3-chloro-2-propene.—Into 310 cc. of water and 33.5 cc. of 22° Bé. aqueous solution of hydrochloric acid, one introduces 78 g. of 1-(m-nitrophenoxy)-3-chloro-2-propene, then at 20° C., 78 g. of pulverized cast iron, agitates for four hours thirty minutes at 100° C., eliminates the insoluble matter by filtering, extracts the aqueous phase with methylene chloride, washes the methylene chloride phase with water, dries it, concentrates it to dryness by distilling under reduced pressure, redistills the residue and obtains 43.4 g. of 1-(m-aminophenoxy) - 3-chloro - 2 - propene. B.P.=122° C. (0.2 mm. Hg). $[n]_D^{19}=1.5887$.

As far as is known, this compound is not described in the literature.

Stage C: m-(3'-chloroallyloxy)-phenyl-isocyanate.—Into 160 cc. of a 20% phosgene solution in toluene one introduces a solution of 42 g. of 1-(m-aminophenoxy)-3-chloro-2-propene in 400 cc. of toluene, takes the reaction mixture to reflux and keeps it there for three hours while bubbling in phosgene, concentrates to dryness by distilling under reduced pressure, redistills the residue and obtains 29 g. of m-(3'-chloroallyloxy)-phenyl-isocyanate. B.P.=123° C. (0.4 mm. Hg). $[n]_D^{19}=1.5623$.

As far as is known, this compound is not described in the literature.

(III) 3-methylthiophenyl-isocyanate

Into 210 cc. of a 20% phosgene solution in toluene one introduces 42 g. of m-methtylthio-aniline in solution in 250 cc. of toluene, agitates for three hours thirty minutes at 75° C., leaves for fifteen hours at room temperature, eliminates the toluene by distilling under reduced pressure and obtains 45 g. of 3-methylthiophenyl-isocyanate. B.P.=82° C. (0.4 mm. Hg). $[n]_D^{21}=1.6030$.

As far as is known, this compound is not described in the literature.

In an analogous manner, by the action phosgene on the suitable aniline derivative, the following isocyanates were obtained:

starting with 3-methylsulfinylaniline (Cf. Beilstein, 13, I, 141), one obtains 3-methylsulfinylphenyl-isocyanate;
starting with 3-methylsulfonylaniline (Cf. Beilstein, 13, I, 141), one obtains 3-methylsulfonylphenyl)-isocyanate, B.P.=163° C. (3 mm. Hg);
starting with 3-chloro-4-methylaniline (Cf. Beilstein, 12, 988; I, 435; II, 530), one obtains 3-chloro-4-methylphenylisocyanate, B.P.=90° C. (2 mm. Hg);
starting with m-methoxy aniline (Cf. Beilstein, 13, 404; I, 129; II, 211), one obtains m-methoxyphenyl-isocyanate, B.P.=108° C. (22 mm. Hg); $[n]_D^{22}=1.5460$.

As far as is known, these four compounds are not described in the literature.

(IV) 2-methylamino-tetrahydropyran

One takes a mixture of 100 g. of dihydropgyran and 400 cc. of 0.02 N hydrochloric acid aqueous solution to reflux, keeps reflux for one hour thirty minutes, cools the reaction mixture, adds potassium carbonate thereto and separates the supernatant oil by decanting.

To the oil thus obtained one adds slowly, at +5° C., 85 cc. of aqueous solution of methylamine titrating 35.4 g. per 100 cc., leaves to rest for one hour at 20° C., adds, while cooling, potash in pellets, separates, by decanting, the supernatant oil, redistills it under reduced pressure and obtains 30.5 g. of 2-methylamino-tetrahydropyran. B.P.=27° C. (0.8 mm. Hg).

EXAMPLE 1

N-methyl-N-(2-tetrahydropyrannyl)-N'-(3',4'-dichlorophenyl)-urea

In a solution of 30 g. of 3,4-dichlorophenylisocyanate [obtained according to the method described by Werner Siefken, Annalen, 562, 75 (1949)], in 300 cc. of isopropyl ether, one adds a solution of 24.3 g. of 2-methylamino-tetrahydropyran in 700 cc. of isopropyl ether. After one hour, one isolates the precipitate thus formed by suction-filtering and obtains 16 g. of crude product, M.P.=124° C.

By concentration of the ethereal mother liquors one obtains a second yield of 4 g. M.P.=124° C.

The principal fraction and the second yield are combined and crystallized from ethanol, which provides 11.5 g. of N-methyl - N - (2-tetrahydropyrannyl)-N'-(3',4'-dichlorophenyl)-urea, M.P.=134° C.

A sample of this product is purified by recrystallization from ethanol, M.P.=135° C.

Analysis.—$C_{13}H_{16}Cl_2N_2O_2$; molecular weight=303.19. Calculated (percent): C, 51.50; H, 5.32; Cl, 23.39; N, 9.25. Found (percent): C, 51.6; H, 5.4; Cl, 23.2; N, 9.1.

As far as is known, this compound is not described in the literature.

EXAMPLE 2

N-methyl-N-(2-tetrahydropyrannyl)-N'-(4-bromophenyl)-urea 33 g. of 4-bromophenyl-isocyanate (Cf. Beilstein, 12, 647; I, 321) prepared by the action of a solution of phosgene on p-bromoaniline, are dissolved in 600 cc. of isopropyl ether. One introduces 19.2 g. of 2-methylamino-tetrahydropyran in solution in 200 cc. of isopropyl ether, agitates for one hour at room temperature, isolates the precipitate thus formed by suction-filtering, dries it and obtains 51 g. of N-methyl-N-(2-tetrahydropyrannyl)-N'-(4'-bromophenyl)-urea, M.P.=135° C.

A sample of this product is crystallized from ethylacetate, M.P.=136° C.

Analysis.—$C_{13}H_{17}BrN_2O_2$; molecular weight=313.21. Calculated (percent): C, 49.85; H, 5.47; Br, 25.52; N, 8.95. Found (percent): C, 49.8; H, 5.4; Br, 25.3; N, 8.7.

As far as is known, this compound is not described in the literature.

EXAMPLE 3

N-methyl-N-(2-tetrahydropyrannyl)-N'-(4'-nitrophenyl)-urea

In an analogous manner, by condensation of 4-nitrophenyl-isocyanate (CF. Beilstein, 12, 714; II, 394) and 2-methylamino-tetrahydropyran, one obtains N-methyl-N-(2-tetrahydropyrannyl) - N' - (4'-nitrophenyl)-urea, M.P.=118° C.

Analysis. — $C_{13}H_{17}N_3O_4$; molecular weight=279.29. Calculated (percent): C, 55.90; H, 6.13; N, 15.04. Found (percent): C, 56.1; H, 5.9; N, 15.0.

As far as is known, this compound is not described in the literature.

EXAMPLE 4

N-methyl-N-(2-tetrahydropyrrannyl)-N'-(2'-nitrophenyl)-urea

In an analogous manner, by condensation of 2-nitrophenyl-isocyanate (Cf. Beilstein, 12, 695; II, 373) and 2-methylamino-tetrahydropyran, one obtains N-methyl-N-(2-tetrahydropyrannyl) - N' - (2' - nitrophenyl)-urea, M.P.=68° C.

Analysis. — $C_{13}H_{17}N_3O_4$; molecular weight=279.29. Calculated (percent): C, 55.90; H, 6.13; N, 15.04. Found (percent): C, 56.2; H, 6.2; N, 15.1.

As far as is known, this compound is not described in the literature.

EXAMPLE 5

N-methyl-N-(2-tetrahydropyrannyl)-N'-phenyl-urea

In an analogous manner, by condensation of phenyl-isocyanate (Cf. Beilstein, 12, 437; I, 259; II, 244) and 2-methylamino-tetrahydropyran, one obtains N-methyl-N-(2-tetrahydropyrannyl)-N'-phenyl-urea, M.P.=124° C.

Analysis. — $C_{13}H_{18}N_2O_2$; molecular weight=234.29.

Calculated (percent): C, 66.64; H, 7.75; N, 11.96. Found (percent): C, 66.7; H, 7.5; N, 12.0.

As far as is known, this compound is not described in the literature.

EXAMPLE 6

N-methyl-N-(2-tetrahydropyrannyl)-N'-(3'-trifluoromethylphenyl)-urea

Into 300 cc. of tetrahydrofuran, one introduces 29 g. of m-trifluoromethylphenyl-isocyanate (described in U.S. Pat. 2,625,561), then drop by drop 17.4 g. of 2-methylamino-tetrahydropyran in solution in 100 cc. of tetrahydrofuran, agitates for sixteen hours at room temperature, concentrates to dryness under reduced pressure, dissolves the residue in ethyl acetate, adds isopropyl ether, cools, isolates the precipitate thus formed by suction-filtering and obtains 30 g. of N-methyl-N-(2-tetrahydropyrannyl) - N' - (3' - trifluoromethylphenyl)-urea, M.P. =123° C., which remained unchanged after recrystallization from a mixture of ethyl acetate and isopropyl ether.

Analysis.—$C_{14}H_{17}F_3N_2O_2$; molecular weight=302.28. Calculated (percent): C, 55.63; H, 5.67; F, 18.86; N, 9.28. Found (percent): C, 55.7; H, 6; F, 18.9; N, 9.3.

As far as is known, this compound is not described in the literature.

EXAMPLE 7

N-ethyl-N-(2-tetrahydropyrannyl)-N'-(3',4'-dichlorophenyl)-urea

Into 400 cc. of tetrahydrofuran, one introduces 13 g. of 2-ethylamino-tetrahydropyran [described by C. Glacet and J. C. Couturier, Bull. Soc. Chim., 2097 (1962] then drop by drop a solution of 18.8 g. of 3,4-dichlorophenyl-isocyanate in 100 cc. of tetrahydrofuran, agitates for sixteen hours at room temperature, concentrates to dryness under reduced pressure, crystallizes the residue in isopropyl ether and obtains 23.2 g. of N-ethyl-N-(2-tetrahydropyrannyl) - N' - (3',4'-dichlorophenyl)-urea; M.P. =85° C., which remained unchanged after recrystallization from isopropyl ether.

Analysis.—$C_{14}H_{18}Cl_2N_2O_2$; molecular weight=317.22. Calculated (percent): C, 53.00; H, 5.72; Cl, 22.35; N, 8.84. Found (percent): C, 53.0; H, 5.6; Cl, 22.1; N, 8.7.

As far as is known, this compound is not described in the literature.

EXAMPLE 8

N-methyl-N-(2-tetrahydropyrannyl)-N'-(4'methoxyphenyl)-urea

In 100 cc. of tetrahydrofuran, one dissolves 29.8 g. of p-methoxyphenyl-isocyanate (Cf. Beilstein, 13, 487, I, 171), introduces slowly a solution of 25.3 g. of 2-methylamino-tetrahydropyran in 50 cc. of tetrahydrofuran, agitates for sixteen hours at 20° C., isolates the precipitate thus formed by suction-filtering and obtains 46.5 g. of N-methyl-N-(2 - tetrahydropyrannyl) - N' - (4' - methoxyphenyl)-urea, M.P.=154° C., which remained unchanged after recrystallization from ethanol.

Analysis.—$C_{14}H_{20}N_2O_3$; molecular weight=264.33. Calculated (percent): C, 63.61; H, 7.63; N, 10.60. Found (percent): C, 63.4; H, 7.6; N, 10.9.

As far as is known, this compound is not described in the literature.

EXAMPLE 9

N-methyl-N-(2-tetrahydropyrannyl)-N'-(3'-methoxyphenyl)-urea

Into 100 cc. of tetrahydrofuran, one introduces 29.8 g. of m-methoxyphenyl-isocyanate, then at 20° C., in thirty minutes, 25.3 g. of 2-methylamino-tetrahydropyran in solution in 50 cc. of tetrahydrofuran, agitates for four hours at ambient temperature, isolates the precipitate thus formed by suction-filtering, washes it, dries it and obtains 16.4 g. of N-methyl-N - (2 - tetrahydropyrannyl)-N'-(3'-methoxyphenyl)-urea, M.P.=104° C.

One concentrates the mother liquors under reduced pressure, isolates the precipitate thus formed by suction-filtering and obtains a second crop of 33.4 g. of N-methyl-N - (2 - tetrahyropyrannyl) - N' - (3' - methoxyphenyl)-urea, M.P.=104° C., which remained unchanged after recrystallization from ethanol.

Analysis.—$C_{14}H_{20}N_2O_3$; molecular weight=264.33. Calculated (percent): C, 63.61; H, 7.63; N, 10.6. Found (percent): C, 63.4; H, 7.7; N, 10.9.

As far as is known, this compound is not described in the literature.

EXAMPLE 10

N-methyl-N-(2-tetrahydropyrannyl)-N'-[4'-(3''-chloroallyloxy)-phenyl]-urea

In 300 cc. of tetrahydrofuran, one dissolves 22 g. of p-(3'-chloroallyloxy)-phenyl-isocyanate.

One introduces slowly a solution of 12.4 g. of 2-methylamino-tetrahydropyran in 70 cc. of tetrahydrofuran, agitates for sixteen hours at 20° C., eliminates the insoluble material thus formed by filtering, concentrates the filtrate to dryness, washes the resulting crystals with isopropyl ether, dries them and obtains 31 g. of N-methyl-N-(2-tetrahydropyrannyl)-N'-[4' - (3'' - chloroallyloxy)-phenyl]-urea. M.P.=118° C., which remained unchanged after recrystallization from a mixture of isopropyl ether and ethyl acetate (1–1).

Analysis.—$C_{16}H_{21}ClN_2O_3$; molecular weight=324.81. Calculated (percent): C, 59.16; H, 6.51; Cl, 10.92; N, 8.63. Found (percent): C, 58.9; H, 6.2; Cl, 11.1; N, 8.7.

As far as is known, this compound is not described in the literature.

EXAMPLE 11

N-methyl-N-(2-tetrahydropyrannyl)-N'-[3'-(3''-chloroallyloxy)-phenyl]-urea

In 380 cc. of tetrahydrofuran, one dissolved 29 g. of m - (3' - chloroallyloxy)-phenyl-isocyanate, introduces slowly a solution of 16 g. of 2-methylamino-tetrahyropyran in 100 cc. of tetrahydrofuran, agitates for sixteen hours at 20° C., eliminates the insoluble material thus formed by filtering, concentrates the filtrate to dryness, washes the resulting crystals with isopropyl ether, dries them and obtains 35 g. of N-methyl-N-(2-tetrahydropyrannyl)-N' - [3'-(3'' - chloroallyloxy) - phenyl]-urea. M.P.=90° C., which remained unchanged after recrystallization from a mixture of ethyl acetate and isopropyl ether.

Analysis.—$C_{16}H_{21}ClN_2O_3$; molecular weight=324.81. Calculated (percent): C, 59.16; H, 6.51; Cl, 10.92; N, 8.63. Found (percent): C, 59.3; H, 6.5; Cl, 10.9; N, 8.6.

As far as is known, this compound is not described in the literature.

EXAMPLE 12

N-methyl-N-(2-tetrahydropyrannyl)-N'-(2'-methoxycarbonylphenyl)-urea

In 120 cc. of isopropyl ether, one dissolves 26.4 g. 2-methylamino-tetrahydropyran, introduces slowly a solution of 40 g. of o-(methoxycarbonyl)-phenyl-isocyanate (described in Dutch patent application 64.07857) in 240 cc. of isopropyl ether, takes the reaction mixture to reflux, keeps refluxing for thirty minutes, agitates at 20° C. for seventeen hours, concentrates to dryness, washes the resulting precipitate with petroleum ether, dries it, purifies the resulting product by chromatography on silica gel and elution with a mixture of benzene and acetone (9–1), crystallizes from petroleum ether and obtains 36.6 g. of N-methyl-N-(2-tetrahydropyrannyl) - N' - (2'-methoxycarbonylphenyl)-urea; M.P.=72° C.

Analysis.—$C_{15}H_{20}N_2O_4$; molecular weight=292.33. Calculated (percent): C, 61.62; H, 6.90; N, 9.59. Found (percent): C, 61.7; H, 6.9; N, 9.7.

EXAMPLE 13

N-methyl-N-(2-tetrahydropyrannyl)-N'-(3'-methylthiophenyl)-urea

Into 200 cc. of isopropyl ether, one introduces 82.6 g. of m-methylthiophenyl-isocyanate, then slowly a solution of 57.6 g. of 2-methylamino-tetrahydropyran in 200 cc. of isopropyl ether, agitates for one hour at room temperature, isolates the precipitate thus formed by suction-filtering, washes it, dries it and obtains 135 g. of N-methyl - N - (2 - tetrahydropyrannyl) - N' - (3'-methylthiophenyl)-urea. M.P.=107° C., which remained unchanged after recrystallization from ethanol.

Analysis.—$C_{14}H_{20}N_2O_2S$; molecular weight=280.38. Calculated (percent): C, 59.97; H, 7.19; N, 9.99; S, 11.43. Found (percent): C, 60.3; H, 7.4; N, 10.1; S, 11.4.

As far as is known, this compound is not described in the literature.

EXAMPLE 14

N-methyl-N-(2-tetrahydropyrannyl)-N'-(3'-methylsulfinylphenyl)-urea

In an analogous manner, by condensation of 2-methylamino-tetrahydropyran with 3'-methylsulfinylphenyl-isocyanate, one obtains N-methyl-N-(2-tetrahydropyrannyl)-N'-(3'-methylsulfinylphenyl)-urea.

As far as is known, this compound is not described in the literature.

EXAMPLE 15

N-methyl-N-(2-tetrahydropyrannyl)-N'-(3'-methylsulfonylphenyl)-urea

In an analoguous manner, by condensation of 2-methylamino-tetrahydropyran with 3'-methylsulfonylphenyl-isocyanate, one obtains N-methyl-N-(2-tetrahydropyrannyl)-N'-(3'-methylsulfonylphenyl)-urea; M.P.=153° C.

As far as is known, this compound is not described in the literature.

EXAMPLE 16

N-methyl-N-(2-tetrahydropyrannyl)-N'-(3'-chloro-4'-methoxyphenyl)-urea

In an analogous manner, by condensation of 2-methylamino-tetrahydropyran with 3-chloro-4-methoxyphenyl-isocyanate (described in U.S. Pat. 2,689,861), one obtains N - methyl - N - (2-tetrahydropyrannyl)-N'-(3'-chloro-4'-methoxyphenyl)-urea, M.P.=125° C.

As far as is known, this compound is not described in the literature.

EXAMPLE 17

N-methyl-N-(2-tetrahydropyrannyl)-N'-(3'-chloro-4'-methylphenyl)-urea

In an analogous manner by condensation of 2-methylamino-tetrahydropyran with 3-chloro-4-methylphenyliso-cyanate, one obtains N-methyl-N-(2-tetrahydropyrannyl)-N'-(3'-chloro-4'-methylphenyl)-urea, M.P.=133° C.

As far as is known, this compound is not described in the literature.

EXAMPLE 18

N-methylN-(2-tetrahydropyrannyl)-N'-(3',4'-dichlorophenyl)-thiourea

Into 50 cc. of tetrahydrofuran, one introduces 20.4 g. of 3,4-dichlorophenyl-isothiocyanate (Cf. Beilstein, 12, II, 337), then 12.3 g. of 2-methylamino-tetrahydropyran, agitates for four hours at 20° C., eliminates the tetrahydrofuran by distilling under reduced pressure, adds isopropyl ether to the residue, isolates the crystals thus formed by suction-filtering and obtains 26 g. of N-methyl-N-(2-tetrahydropyrannyl) - N' - (3',4' - dichlorophenyl)-thiourea; M.P.=105° C. which remained unchanged after recrystallization from ethanol.

Analysis.—$C_{13}H_{16}Cl_2N_2OS$; molecular weight=319.25. Calculated (percent): C, 48.91; H, 5.05; Cl, 22.21; N, 10.05; S, 8.77. Found (percent): C, 48.8; H, 5.2; Cl, 22.0; N, 10.1; S, 8.7.

As far as is known, this compound is not described in the literature.

EXAMPLE 19

Wettable powder composition

| | Parts by weight |
|---|---|
| N - methyl - N - (2-tetrahydropyrannyl)-N-(3',4'-dichlorophenyl)-urea | 25 |
| Ekapersol S [1] | 15 |
| Brecolane N.V.A. [2] | 0.5 |
| Synthetic hydrated silica | 34.5 |
| Colloidal kaolin | 25 |

[1] Ekapersol S is the trade name of a sodium dinaphtylmethanedisulfonate.
[2] Brecolane N.V.A. is the trade name of a sodium alkylnaphtalenesulfonate.

The above ingredients were mixed and crushed until a fine powder was obtained. The composition thus obtained can be applied with the usual spraying devices.

Following the same procedure, a composition comprising N-methyl-N-(2-tetrahydropyrannyl)-N'-(3',4'-dichlorophenyl)-thiourea, as active ingredient, and a composition containing N-methyl-N-(2-tetrahydropyrannyl)-N'-[4'-(3''-chloroallyloxy)-phenyl] urea, as active ingredient, were obtained.

EXAMPLE 20

Preparation of a water-dispersible concentrate

The following ingredients were intimately mixed until a homogeneous liquid was obtained:

| | Parts by weight |
|---|---|
| N - methyl-N-(2-tetrahydropyrannyl)-N'-(3'-trifluoromethylphenyl)-urea | 10 |
| Atlox 4851 | 6 |
| Atlox 4855 | 4 |
| Cyclohexanone | 40 |
| Xylene | 40 |

The above-obtained concentrate must be diluted with water before use.

Atlox 4851 is the trade name of a mixture of alkylarylsulfonate and polyoxyethylene triglyceride; viscosity at 25° C.=300–700 cps.

Atlox 4855 is the trade name of a mixture of alkylarylsulfonate and polyoxyethylene triglyceride; viscosity at 25° C.=1500–1900 cps.

As indicated above, the compounds of Formula I possess herbicidal properties. These properties were evidenced by tests on plants representative of the great botanical families, such as oats, wheat, maize, foxtail grass (Gramineae), beet (Chenopodiaceae), chrysanthemum (Compositae), clover (Papilionaceae), flax (Linaceae), and mustard (Cruciferae).

Examples of these tests are given below.

Study of the pre-emergence herbicidal properties of N-methyl - N - (2-tetrahydropyrannyl)-N'-(3',4'-dichlorophenyl)-urea (hereinafter Compound A)

The tests were effected on the following plants species: oats, beet, wheat, chrysanthemum, flax, maize, mustard, clover and foxtail grass.

Sowing was effected in culture vessels with a double-bottom for watering from below. The 9 species were sown at the rate of 20 seeds per plant species, in each vessel, and four vessels were used for each dose of the tested compound. The conditions of cultivation are the following: temperature: 20°±2° C.; relative humidity: about 60%; lighting: by fluorescent tube (daylight and brilliant white type), every day from six a.m. to ten p.m. The earthy mixture used was composed of ten volumes of earth, ten volumes of river gravel and two volumes of peat.

The product to be studied was applied under standard conditions, by means of a microsprayer, at doses corresponding to 10, 5, 2.5 and 1.25 kg./ha. and at a dilution corresponding to 560 l./ha. The treatment was effected 24 hours after sowing.

The efficacy of the tested compound was checked by weighing the seedlings twenty-one days after treatment, in comparison with non-treated controls.

The results are expressed in percentage of reduction of the vegetation P.

$$P = \frac{\text{weight of the control seedlings} - \text{weight of the treated seedlings}}{\text{weight of the control seedlings}} \times 100$$

The following table expresses the results obtained in pre-emergence treatment for compound A.

PERCENTAGE P OF REDUCTION OF THE VEGETATION

| | Doses in kg. of Compound A per hectare | | | |
|---|---|---|---|---|
| | 10 | 5 | 2.5 | 1.25 |
| Oats, percent | 78 | 69 | 74 | 27 |
| Wheat, percent | 30 | 28 | 30 | 23 |
| Maize, percent | 21 | 16 | 14 | 11 |
| Foxtail grass, percent | 92 | 93 | 91 | 85 |
| Beet, percent | | | | 100 |
| Chrysanthemum, percent | | | | 100 |
| Flax, percent | | 100 | 88 | 83 |
| Mustard, percent | | | | 100 |
| Clover, percent | | | | 100 |

Conclusion: Compound A possesses a good pre-emergence herbicidal activity on dicotyledons and foxtail grass, at a dose of 1.25 kg./ha., while it has only a slight activity on cultivated gramineous plants (oats, wheat and maize), at the same dose.

Study of the postemergence herbicidal properties of N-methyl-N-(2-tetrahydropyrannyl) - N' - (3' - trifluoromethylphenyl)-urea, therein after Compound B)

The method was analogous to that described in the preceding test, but the treatment is effected after twenty-one days of cultivation.

The product to be studied was applied under standard conditions, by means of a microsprayer, at doses corresponding to 5, 2.5, 1.25 and 0.62 kg./ha. and at a dilution corresponding to 560 l./ha.

The efficacy of the tested compound was checked by weighing the seedlings fifteen days after treatment, in comparison with non-treated controls.

The results are expressed in percentage of reduction of the vegetation P:

$$P = \frac{\text{weight of the control seedlings} - \text{weight of the treated seedlings}}{\text{weight of the control seedlings}} \times 100$$

The following table summarizes the experimental results obtained with compound B.

PERCENTAGE P OF REDUCTION OF THE VEGETATION

| | Doses in kg. of Compound B per hectare | | | |
|---|---|---|---|---|
| | 5.0 | 2.5 | 1.25 | 0.62 |
| Oats, percent | 40 | 39 | 10 | |
| Beet, percent | | | 100 | 70 |
| Wheat, percent | 35 | 33 | 13 | 7 |
| Chrysanthemum, percent | | | 100 | 18 |
| Flax, percent | | 100 | 50 | |
| Maize, percent | 53 | 30 | 15 | 4 |
| Mustard, percent | | | 100 | 60 |
| Clover, percent | | | 100 | 60 |
| Foxtail grass, percent | 100 | 45 | 31 | 14 |

Conclusion: At a dose of 1.25 kg./ha. compound B possesses a good post-emergence herbicidal activity, while having parctically no adverse effects with respect to oats, wheat and maize.

The post-emergence herbicidal activity of Compound A was evidence by analogous tests on the same plants.

In the same pre-emergence and post-emergence tests, N - methyl-N-(2-tetrahydropyrannyl)-N'-[4'-(3''-chloroallyloxy) - phenyl]-urea and N-methyl-N-(2-tetrahydropyrannyl)-N'-[3'-(3''chloroallyloxy)-phenyl] - urea were found to possess a marked herbicidal activity.

Various modifications of the process, compositions and methods of the invention may be made without departing from the spirit and scope thereof.

We claim:

1. A herbicidal composition comprising from 5 to 80% by weight of at least one compound of the formula:

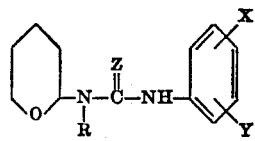

wherein R is lower alkyl, X and Y, identical or different, are selected from the group consisting of hydrogen, chlorine, bromine, nitro, trifluoromethyl, lower alkyloxy, lower alkyl, lower alkenyloxy, halogen-substituted lower alkenyloxy, lower alkyloxycarbonyl, lower alkylthio, lower alkylsulfinyl and lower alkylsulfonyl and Z is selected from the group consisting of oxygen and sulfur, as active ingredient, and an adjuvant.

2. A method of controlling the growth of weeds which comprises contacting said weeds and their seeds with a herbicidally effective amount of a compound of the formula:

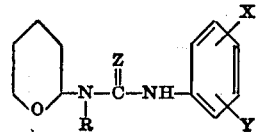

wherein R is lower alkyl, X and Y, identical or different, are selected from the group consisting of hydrogen, chlorine, bromine, nitro, trifluoromethyl, lower alkyloxy, lower alkyl, lower alkenyloxy, halogen-substituted lower alkenyloxy, lower alkyloxycarbonyl, lower alkylthio, lower alkylsulfinyl and lower alkylsulfonyl and Z is selected from the group consisting of oxygen and sulfur.

3. The method of claim 2 wherein Z is oxygen, X is selected from the group consisting of hydrogen, chlorine and bromine, Y is selected from the group consisting of hydrogen, chlorine, bromine, nitro and trifluoromethyl.

4. The method of claim 2 wherein the compound is N-methyl-N-(2-tetrahydropyrannyl)-N'-(3',4'-dichlorophenyl)-urea.

5. The method of claim 2 wherein the compound is N-methyl-N-(2-tetrahydropyrannyl)-N'-(4' - bromophenyl)-urea.

6. The method of claim 2 wherein the compound is N-methyl-N-(2-tetrahydropyrannyl) - N' - (4'-nitrophenyl)-urea.

7. The method of claim 2 wherein the compound is N-methyl-N-(2-tetrahydropyrannyl) - N' - (2'-nitrophenyl)-urea.

8. The method of claim 2 wherein the compound is N-methyl-N-(2-tetrahydropyrannyl)-N'-phenyl-urea.

9. The method of claim 2 wherein the compound is N-methyl - N - (2 - tetrahydropyrannyl) - N' - (3'-trifluoromethylphenyl)-urea.

10. The method of claim 2 wherein the compound is N-ethyl - N - (2-tetrahydropyrannyl)-N'-(3',4' - dichlorophenyl)-urea.

11. The method of claim 2 wherein the compound is N-methyl - N - (2-tetrahydropyrannyl) - N' - (4'-methoxyphenyl)-urea.

12. The method of claim 2 wherein the compound is N-methyl - N - (2-tetrahydropyrannyl) - N' - (3'-methoxyphenyl)-urea.

13. The method of claim 2 wherein the compound is N-methyl - N - (2-tetrahydropyrannyl)-N'-[4'-(3"-chloroallyloxy)-phenyl]-urea.

14. The method of claim 2 wherein the compound is N-methyl - N - (2-tetrahydropyrannyl)-N'-[3'-(3"-chloroallyloxy)-phenyl]-urea.

15. The method of claim 2 wherein the compound is N-methyl - N - (2-tetrahydropyrannyl)-N'-(2'-methoxycarbonylphenyl)-urea.

16. The method of claim 2 wherein the compound is N-methyl - N - (2-tetrahydropyrannyl)-N'-(3'-methylthiophenyl)-urea.

17. The method of claim 2 wherein the compound is N-methyl - N - (2-tetrahydropyrannyl)-N'-(3'-methylsulfinylphenyl)-urea.

18. The method of claim 2 wherein the compound is N-methyl - N - (2 - tetrahydropyrannyl)-N'-(3'-methylsulfonylphenyl)-urea.

19. The method of claim 2 wherein the compound is N-methyl - N - (2-tetrahydropyrannyl) - N' - (3'-chloro 4'-methoxyphenyl)-urea.

20. The method of claim 2 wherein the compound is N-methyl - N - (2 - tetrahydropyrannyl)-N'-(3'-chloro-4'-methylphenyl)-urea.

21. The method of claim 2 wherein the compound is N-methyl - N - (2-tetrahydropyrannyl)-N'-(3',4'-dichlorophenyl)-thiourea.

References Cited
UNITED STATES PATENTS

| | | | |
|---|---|---|---|
| 3,594,405 | 7/1971 | Loux | 71—88 |
| 3,547,940 | 12/1970 | Brantley | 71—88 |
| 3,309,192 | 3/1967 | Luckenbaugh | 71—120 |

LEWIS GOTTS, Primary Examiner

C. L. MILLS, Assistant Examiner